United States Patent
Xie et al.

(10) Patent No.: US 10,526,714 B2
(45) Date of Patent: Jan. 7, 2020

(54) METHOD AND DEVICE FOR USING $CO_2$ MINERALIZATION TO PRODUCE SODIUM BICARBONATE OR SODIUM CARBONATE AND OUTPUT ELECTRIC ENERGY

(71) Applicant: SICHUAN UNIVERSITY, Chengdu, Sichuan (CN)

(72) Inventors: Heping Xie, Sichuan (CN); Yifei Wang, Sichuan (CN); Tao Liu, Sichuan (CN); Jinlong Wang, Sichuan (CN)

(73) Assignee: SICHUAN UNIVERSITY, Chengdu, Sichuan (CN)

( * ) Notice: Subject to any disclaimer, the term of this patent is extended or adjusted under 35 U.S.C. 154(b) by 224 days.

(21) Appl. No.: 15/323,852

(22) PCT Filed: Jun. 3, 2015

(86) PCT No.: PCT/CN2015/080617
§ 371 (c)(1),
(2) Date: Jan. 4, 2017

(87) PCT Pub. No.: WO2016/004802
PCT Pub. Date: Jan. 14, 2016

(65) Prior Publication Data
US 2017/0137951 A1    May 18, 2017

(30) Foreign Application Priority Data
Jul. 7, 2014   (CN) .......................... 2014 1 0319920

(51) Int. Cl.
*C25B 5/00*    (2006.01)
*H01M 4/92*    (2006.01)
(Continued)

(52) U.S. Cl.
CPC .................. *C25B 5/00* (2013.01); *C25B 1/14* (2013.01); *H01M 4/926* (2013.01); *H01M 8/0693* (2013.01)

(58) Field of Classification Search
CPC ... C25B 5/00; C25B 9/08; C25B 1/14; H01M 4/925; H01M 4/926; H01M 8/0693; Y02E 60/366
See application file for complete search history.

(56) References Cited

U.S. PATENT DOCUMENTS

2010/0224503 A1*  9/2010  Kirk .................. B01D 53/62
                                                                  205/351
2010/0230293 A1    9/2010  Gilliam et al.

FOREIGN PATENT DOCUMENTS

CN         101984749 A     3/2011
CN         103173782 A     6/2013

* cited by examiner

*Primary Examiner* — Arun S Phasge
(74) *Attorney, Agent, or Firm* — Novick, Kim & Lee, PLLC; Allen Xue

(57) ABSTRACT

Disclosed are a method and device for using $CO_2$ mineralization to produce sodium bicarbonate or sodium carbonate and output electric energy. The device comprises an anode area, an intermediate area, and a cathode area. The anode area and the intermediate area are spaced by a negative ion exchange membrane (2). The intermediate area and the cathode area are spaced by a positive ion exchange membrane (3). The anode area, the intermediate area, and the cathode area can accommodate corresponding electrolytes. An anode electrode (1) is disposed in the anode area, a cathode electrode (4) is disposed in the cathode area, and the cathode electrode and the anode electrode are connected through a circuit. A raw material hydrogen gas inlet is disposed in the anode area, and a $CO_2$ inlet and a product hydrogen gas outlet are disposed in the cathode area. The (Continued)

method is based on the principle of $CO_2$ mineralization and utilization, combines the membrane electrolysis technology, facilitates spontaneous reaction by using the acidity of $CO_2$ and the alkalinity of the reaction solution and realizes separation of the products, and converts through a membrane electrolysis apparatus the energy released by the reaction into electric energy at the same time when producing the sodium bicarbonate or sodium carbonate and outputs the electric energy. The method and device have low energy consumption, high utilization rate of raw materials and little environmental pollution, and can output electric energy while producing sodium carbonate at the same time.

12 Claims, 2 Drawing Sheets

(51) Int. Cl.
*C25B 1/14* (2006.01)
*H01M 8/06* (2016.01)

METHOD AND DEVICE FOR USING $CO_2$ MINERALIZATION TO PRODUCE SODIUM BICARBONATE OR SODIUM CARBONATE AND OUTPUT ELECTRIC ENERGY

FIELD OF THE INVENTION

The invention relates to the $CO_2$ emission reduction, in particular to a method and device for using $CO_2$ mineralization to produce sodium bicarbonate or sodium carbonate and output electric energy.

DESCRIPTION OF THE RELATED ART

Since the industrial revolution, the $CO_2$-dominated greenhouse gas emitted from human activities has become a main factor affecting global climate change. It is estimated that the average annual growth rate of carbon dioxide emission is 5.4% by 2015 and will be 3.3% from 2015 to 2030, and China's $CO_2$ emission will reach 11.4 billion tons in 2030. Therefore, reducing $CO_2$ emission has become a global consensus. However, it is estimated that fossil fuels such as coal, oil and natural gas will continue to be the primary source of primary energy and will account for 84% of the total energy demand growth from 2005 to 2030. It is optimistically estimated that the global $CO_2$ emission will reach 35.4 billion tons by 2035, and $CO_2$ produced from fossil fuel consumption will continue to grow. So far, it is widely accepted that the conversion of fossil fuels such as coal and petroleum into $CO_2$ is the end point of energy release, and it is generally believed that treatment of $CO_2$ is a chemical energy consumption process. Therefore, many studies on $CO_2$ mineralization are devoted to reducing the energy consumption from reaction, and increasing the added value of products so as to achieve the economic feasibility of $CO_2$ mineralization. However, almost all researchers have neglected that the $\Delta G$ of the theoretical transition from $CO_2$ to more stable carbonate is less than 0, which means that the mineralization process can be carried out spontaneously and have energy release. If the chemical energy released during $CO_2$ mineralization is available, it is possible to achieve a $CO_2$ emission reduction method with energy output rather than energy consumption. In general, the mineralization reaction is exothermic. Previous studies have suggested that we can recover the reaction heat, but the implementation of this method is questionable due to the efficiency of heat recovery.

SUMMARY OF THE INVENTION

In view of the problems, the invention provides a new $CO_2$ utilization method, i.e. a method for using $CO_2$ mineralization to produce sodium bicarbonate or sodium carbonate and output electric energy, in order to realize electric energy output without requiring external energy in the process of using $CO_2$ mineralization, and solve the problems of existing soda preparation methods such as high energy consumption, complex process, severe environmental pollution and low efficiency. We have designed a $CO_2$ mineralized fuel cell (CMFC) to achieve efficient utilization of $CO_2$ by resetting the electrolytic process. Calcium hydroxide $(Ca(OH)_2)$ is an important caustic industrial waste and often present in carbide slag, steel slag, pulp waste, cement kiln dust and fly ash. According to existing $CO_2$ mineralization utilization studies, calcium hydroxide is directly used to react with $CO_2$ to produce calcium carbonate. Calcium carbonate is an important industrial raw material, but its natural reserve is excessive. However, sodium bicarbonate $(NaHCO_3)$, an important raw material for producing sodium carbonate, sodium bicarbonate, magnesium carbonate and other products, severely lacks in the industry. Therefore, we introduced NaCl into the reaction system with a hope to produce sodium bicarbonate capable of replacing calcium carbonate. Finally, we achieved the reaction (1) by taking the $CO_2$ mineralization reaction as a prototype:

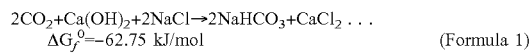

$$2CO_2+Ca(OH)_2+2NaCl \rightarrow 2NaHCO_3+CaCl_2 \ldots$$
$$\Delta G_f^\circ = -62.75 \text{ kJ/mol} \qquad \text{(Formula 1)}$$

Gibbs free energy of the reaction (1) is −62.75 KJ/mol, but such energy cannot be directly converted into electric energy. In addition, if the reactants are simply mixed, only calcium carbonate is generated directly. Therefore, we designed a $CO_2$ mineralized fuel cell based on the membrane electrolysis technology.

The invention is realized by the following technical solution:

A method for using $CO_2$ mineralization to produce sodium bicarbonate or sodium carbonate and output electric energy, wherein based on the $CO_2$ mineralization utilization principle and the membrane electrolysis technology, acidity of $CO_2$ and alkalinity of a reaction solution facilitate spontaneous reaction and separation of products, thereby producing sodium bicarbonate or sodium carbonate and converting energy released from the reaction into electric energy by a membrane electrolyzer for output.

Optionally, in the method, an anion exchange membrane and a cation exchange membrane are placed in a container, the container is divided into an anode region, an intermediate region and a cathode region; an alkaline material is added to a liquid in the anode region to form an anolyte, sodium salt as a raw material of electrolytic reaction is added to a liquid in the intermediate region to form an intermediate electrolyte, and a catholyte is added to the cathode region; a cathode electrode and an anode electrode are connected to form a current path, anions and sodium ions formed by decomposing the sodium salt in the intermediate electrolyte are respectively introduced into the anode region and the cathode region through the anion exchange membrane and the cation exchange membrane in the presence of current; in the anode region, hydrogen ions generated by oxidation of hydrogen on the anode electrode are neutralized with the added alkaline material so that the anions penetrating the anion exchange membrane are combined with the cations in the anolyte to form salts; in the cathode region, hydrogen ions in the catholyte are reduced to hydrogen in the cathode electrode by continuously introducing $CO_2$ gas to the catholyte, and the $CO_2$ in the catholyte is converted into bicarbonate radical that reacts with the sodium ions to produce sodium bicarbonate; then, based on the potential formed by the difference in the pH value between the anode region and cathode region, energy released by the acid-base neutralization reaction in the anode region and $CO_2$ mineralization reaction in the cathode region is converted into electric energy in the presence of $H_2$ to realize electric energy output.

Optionally, in the method, the sodium bicarbonate produced in the cathode region after completion of the reaction is removed and filtered to obtain solid sodium bicarbonate, or further dried to obtain solid sodium carbonate.

Optionally, in the method, the catholyte is sodium bicarbonate solution with the concentration of 0.1 mol/L to 10 mol/L, and the intermediate electrolyte is sodium salt solution with the concentration of 0.0001 mol/L to 10 mol/L. The materials added to the anode region, the intermediate region and the cathode regions may be in the form of a solid or in the form of a solution. The sodium salt preferably added to the intermediate region is actually a solution with a concentration of 0.1 mol/L to 10 mol/L prepared from sodium salt, or a saturated solution of sodium salt can also be taken as the intermediate electrolyte.

Optionally, in the method, the anolyte and/or catholyte contain a sodium salt. The addition of a small amount of sodium salt to the anolyte and/or catholyte can improve the conductivity of the liquid and achieve better electrochemical effect. Optionally, total concentration of the dissolved phase in the anolyte containing the alkaline material and the sodium salt is generally in the range of 0.0001 mol/L to 10 mol/L, and total concentration of the dissolved phase in the catholyte is generally in the range of 0.0001 mol/L to 10 mol/L.

Optionally, in the method, the sodium salt is selected from sodium chloride, sodium sulfate and sodium nitrate, preferably sodium chloride. The sodium chloride may be extract of natural salt lake and seawater in nature and also be the product of industrial production process.

Optionally, in the method, the alkaline material added to the anode region contains at least one of calcium hydroxide, sodium hydroxide, ammonia and potassium hydroxide produced in the industrial production process, or can be alkaline industrial wastes such as carbide slag, steel slag, pulp waste, cement kiln dust and fly ash, and organic wastes containing amines (ammonia, ethanolamine, and triethylamine).

Optionally, in the method, the anode electrode is a hydrogen diffusion electrode, and the cathode electrode is preferably selected from a nickel foam supported Pt/C catalyst. The Pt support amount is generally in the range of 0.1 to 0.5 mg/cm$^2$.

Optionally, for the gas diffusion electrode made of carbon fiber of an anode electrode material, the surface area is 3.24 cm$^2$, and 1 mg/cm$^2$ Pt/C catalyst is supported on the filling layer on the surface of the carbon paper of the substrate. In addition, a foamed nickel electrode with the same surface area and support amount is taken as the cathode.

Optionally, in the method, the hydrogen generated in the cathode region may be fed to the anode region as raw hydrogen.

Optionally, in the method, the $CO_2$ gas is bubbled into the cathode region.

Optionally, in the method, the volume percentage concentration of the $CO_2$ gas is 10 to 100%.

Optionally, in the method, the sodium salt is used as the catholyte in the initial reaction such as 1 mol/L NaCl solution.

Optionally, in the method, the product produced in the cathode and anode reaction is timely removed, for example, the cathode reaction liquid is removed to carry out crystallization and solid-liquid separation. The resulting liquid phase can also be reintroduced into the reaction system.

Optionally, in the method, the saturated $NaHCO_3$ is used as the catholyte and $CO_2$ is not directly introduced into the cathode region. If no $CO_2$ is introduced into the cathode, residual $HCO_3^-$ in the solution may provide $H^+$ for the reaction and convert it into $CO_3^{2-}$. After a period of reaction, the cathode reaction liquid is removed, and excess carbon dioxide is continuously introduced into the removed reaction solution. Then, $CO_3^{2-}$ will be converted to $HCO_3^-$. When the solubility of sodium bicarbonate in the solution reaches the maximum value, crystals are separated out. After solid-liquid separation, the liquid phase is returned to the reaction system for reaction.

Optionally, in the method, the sodium salt solution is firstly used to wash the reaction zones to counteract the membrane potential caused by the difference in ion concentration.

Optionally, in the method, a voltage of 3V is applied to two electrodes of the system for 5 min so as to completely dissipate the $O_2$ adhering to the electrode surface before formal start of the reaction.

In the technical solutions of the invention, parameters such as power and voltage generated by the reaction are detected and recorded in real time by a DC load.

The invention further provides a device for using $CO_2$ mineralization to produce sodium bicarbonate or sodium carbonate and output electric energy, comprising an anode region, an intermediate region and a cathode region. The cathode region and the intermediate region are separated by an anion exchange membrane, the intermediate region and the cathode region are separated by a cation exchange membrane, the anode region, the intermediate region and the cathode region are capable of accommodating corresponding electrolyte, the anode region is provided with an anode electrode, the cathode region is provided with a cathode electrode, the cathode and anode electrodes are connected by a circuit, the anode region is provided with a raw hydrogen inlet, and the cathode region is provided with a $CO_2$ gas inlet and a product hydrogen outlet.

Optionally, the anode region is used to accommodate an anolyte containing an alkaline material that contains at least one of calcium hydroxide, sodium hydroxide, ammonia and potassium hydroxide produced in the industrial production process, or can be alkaline industrial wastes such as carbide slag, steel slag, pulp waste, cement kiln dust and fly ash, and organic wastes containing amines (ammonia, ethanolamine, and triethylamine). The anolyte may also contain a sodium salt. Total concentration of the dissolved phase in the anolyte is generally in the range of 0.0001 mol/L to 10 mol/L.

Optionally, the intermediate region is used to accommodate the sodium salt solution with the concentration in the range of 0.0001 mol/L to 10 mol/L, preferably the saturated solution of the sodium salt solution.

Optionally, the cathode region is used to accommodate the catholyte, and the catholyte is sodium bicarbonate solution with the concentration being generally in the range of 0.1 mol/L to 10 mol/L; and the catholyte is a saturated solution of sodium bicarbonate. The catholyte may also contain sodium salts such as sodium chloride, sodium sulfate and sodium nitrate. Total concentration of the dissolved phase in the catholyte is generally in the range of 0.0001 mol/L to 10 mol/L.

Optionally, in the device, the anode region, the intermediate region and the cathode region are provided with corresponding electrolyte inlet and outlet respectively.

Optionally, in the device, a hydrogen buffer tank is arranged to collect and store hydrogen produced at the cathode region. The hydrogen can be introduced into the anode area as raw hydrogen and can also be used for other purposes.

Optionally, after electrolyte obtained from the electrolyte outlet in the cathode region is concentrated and subject to solid-liquid separation, the obtained solid phase can be used to prepare sodium bicarbonate or sodium carbonate, and the obtained liquid phase can be returned to the cathode region for recycle. The electrolyte outlet in the cathode region is connected with a crystallizer and a solid-liquid separator by a line with a valve. In use, electrolyte may be periodically or continuously extracted for crystallization and solid-liquid separation.

Optionally, electrolyte obtained from the electrolyte outlet in the intermediate region may be supplemented with sodium salt and returned to the intermediate region for recycle.

Optionally, electrolyte obtained from the electrolyte outlet in the anode region can also be used to produce corresponding salt after crystallization and solid-liquid separation.

Optionally, in the device, the electrolyte inlet in the cathode region is connected with the cathode buffer tank, and electrolyte is supplied to the cathode region through the cathode buffer tank. Further, the electrolyte outlet in the cathode region is connected with a cathode buffer tank so that the reacted electrolyte is returned to the cathode buffer tank for recycle; meanwhile, the $CO_2$ gas inlet in the cathode region is arranged on the cathode buffer tank and a solid-liquid separator is arranged in the cathode buffer tank or an outlet thereof.

Optionally, in the device, the electrolyte inlet in the intermediate region is connected with an intermediate buffer tank, and electrolyte is supplied to the intermediate region through the cathode buffer tank. Further, the electrolyte outlet in the intermediate region is connected with the intermediate buffer tank so that the reacted electrolyte is returned to the intermediate buffer tank for recycle, and the intermediate buffer tank is provided with a sodium salt feed inlet.

Optionally, in the device, the electrolyte inlet in the anode region is connected with an anode buffer tank, and electrolyte is supplied to the anode region through the cathode buffer tank.

Optionally, the device comprises an anode current collecting layer, an anode gas chamber plate and frame, a hydrogen diffusion electrode, an anolyte chamber plate and frame, an anion exchange membrane, an intermediate chamber plate and frame, a cation exchange membrane, a cathode chamber plate and frame, a cathode electrode and a cathode current collecting layer arranged successively, the anode current collecting layer and the cathode current collecting layer are connected by a circuit, the anode chamber, the intermediate chamber and the cathode chamber are capable of accommodating corresponding electrolyte, the anode gas chamber plate and frame is provided with a raw hydrogen inlet and a raw hydrogen outlet, the cathode gas chamber plate and frame is provided with a $CO_2$ gas inlet and a product hydrogen outlet, the anolyte chamber plate and frame, the intermediate chamber plate and frame, and the cathode chamber plate and frame are respectively provided with an inlet and an outlet for corresponding electrolyte. Further, the electrolyte inlet on the cathode chamber plate and frame is connected with the cathode buffer tank, and electrolyte is supplied to the cathode chamber through the cathode buffer tank. Further, the electrolyte outlet on the cathode chamber plate and frame is connected with the cathode buffer tank to form a circulation loop; thus the reacted electrolyte returns to the cathode buffer tank for recycle. Meanwhile, a $CO_2$ gas inlet is arranged on the cathode buffer tank and a solid-liquid separator is arranged in the cathode buffer tank or an outlet thereof. Then, the original $CO_2$ gas inlet on the cathode chamber plate and frame may be closed or taken as a carrier gas inlet to remove the hydrogen by introducing carrier gas.

Optionally, in the device, the electrolyte inlet on the intermediate chamber plate and frame is connected with the intermediate buffer tank, and electrolyte is supplied to the intermediate chamber through the intermediate buffer tank. Further, the electrolyte outlet on the intermediate chamber plate and frame is connected with the intermediate buffer tank to form a circulation loop; thus the reacted electrolyte returns to the intermediate buffer tank for recycle. Meanwhile, the intermediate buffer tank is provided with a sodium salt feed inlet.

Optionally, in the device, the electrolyte inlet on the anolyte chamber plate and frame is connected with the anode buffer tank, and electrolyte is supplied to the anolyte chamber through the anode buffer tank. After the reaction, the electrolyte produced from the electrolyte outlet on the anolyte chamber plate and frame can be discharged as waste liquor, or the reactants can also be recovered after the separation and concentration for other purposes.

Optionally, in the device, the anode electrode material is a hydrogen diffusion electrode, and the cathode electrode is preferably selected from a cathode electrode made from a nickel foam supported Pt/C catalyst. The Pt support amount is generally in the range of 0.1-0.5 $mg/cm^2$.

Optionally, in the device, the raw hydrogen inlet is arranged on the anode electrode.

Optionally, peristaltic pumps or other common devices are used to flow or recycle electrolyte in each chamber.

Optionally, in the device, for the hydrogen diffusion electrode used in the anode electrode, the surface area is 3.24 $cm^2$, and 1 $mg/cm^2$ Pt/C catalyst is supported on the surface of the carbon paper of the substrate. In addition, an electrode taking Pt/C catalyst and having the same surface area and support amount is considered as the cathode.

Optionally, in the device, the gas diffusion electrode actually has a three-layer structure, i.e. a current collecting layer, a carbon cloth layer and a catalyst layer. The 1 $mg/cm^2$ Pt/C catalyst is supported on the carbon cloth, the carbon cloth and the titanium mesh of the current collecting layer are stacked together to press for 10 min at pressure of 5 MP and temperature of 25° C., thus obtaining a gas diffusion electrode.

Optionally, in the device, the cathode electrode is obtained by directly spraying Pt/C catalyst to the carbon cloth at 80° C.

Optionally, in the device, the preparation method of the electrode supported Pt/C catalyst is divided into the following steps: first, placing 0.1 Pgt/C (40% Pt) catalyst in a beaker; then, adding 1 ml of distilled water, 4 ml of absolute ethanol and 4.5 g of perfluorosulfonic acid (Nafion) solution, wherein ethanol and perfluorosulfonic acid play a role in dispersion and adhesion respectively, and sonicating the mixed solution for 2 h before use; spraying the black suspension obtained by sonicating the mixture to the carbon paper at 80° C. and allowing the support amount of Pt/C on the carbon paper to be 1 $mg/cm^2$; drying at 60° C. for 2 h, finally pressing at 3 MPa for 10 min, and pressing the catalyst supported carbon paper onto the conductive material (such as graphite and titanium).

In the technical solution of the invention, when the hydrogen generated by the cathode is used as the hydrogen source for the anode gas diffusion electrode, and the alkaline solution in the anode region is a solution containing calcium hydroxide only, formula 1 shows overall reaction of using $CO_2$ mineralization to produce sodium chloride and output electricity.

The method for using $CO_2$ mineralization to produce sodium bicarbonate or sodium carbonate and output electric energy provided by the invention is completed based on the inventors' profound understanding and research on the electrochemical process. In the electrochemical process, many factors can cause the potential difference such as a concentration potential formed by concentration difference of the solution between cathode and anode, a diffusion potential formed by ion diffusion between the cathode and anode, a reaction potential generated by an oxidation reaction in the cathode and a reduction reaction in the anode respectively, or a potential caused by the difference between the acid and alkaline of the solution between the cathode and the anode. According to the theoretical formula $\Delta E=-0.059(pH_{cathode}-pH_{anode})$, in other words, if $pH_{anode}$ is more than $pH_{cathode}$, external electricity output can be realized after the circuit is connected. The invention realizes external power generation by mainly utilizing the potential generated by the reaction between the cathode and anode and the potential produced by the $\Delta pH$. The specific electricity generation process is as follows: by using energy released by the acid-base neutralization reaction in the anode region and the $CO_2$ reaction into carbonate in the cathode region, and taking $H_2$ as a medium, the energy released by the reaction is converted into electric energy; meanwhile, because of a large pH difference between the alkaline material added to the anode region and the carbonate formed by continuous introduction of $CO_2$ in the cathode region, the difference can be converted to the potential of the $CO_2$ power generation assembly. As a result, once the current load is accessed, the anion and anode reaction can produce sodium bicarbonate and realize external power generation.

The method for using $CO_2$ mineralization to produce sodium bicarbonate or sodium carbonate and output electric energy provided by the invention applies the membrane electrolysis technology to the $CO_2$ mineralization field, and realizes the $CO_2$ mineralization reaction to output electrical work without external energy for the first time. Meanwhile, the mineralization products are separated with the help of membrane separation effect to get sodium bicarbonate, and the resulting sodium bicarbonate is pyrolyzed to produce high purity sodium carbonate. Therefore, the invention is new in basic method principle and specific process. At room temperature, each reaction unit can provide about 0.1-0.4V of external voltage during spontaneous reaction; in other words, $CO_2$ power generation assembly in series can do work externally and produce a large amount of high purity sodium bicarbonate or sodium carbonate. Therefore, the method has great application prospect.

According to the method for using $CO_2$ mineralization to produce sodium bicarbonate or sodium carbonate and output electric energy provided by the invention, $CO_2$ is mineralized into high value-added sodium bicarbonate or sodium carbonate, and energy released by the mineralization reaction is converted into electric energy, which solves high energy consumption, large waste liquid discharge and low utilization of raw materials in the preparation process of sodium bicarbonate or sodium carbonate, achieves external power generation during overall process, breaks through the concept inherent to the people that energy consumption is inevitable in the sodium bicarbonate or sodium carbonate preparation process, and realizes zero energy consumption of $CO_2$ emission reduction in a real sense.

MARKS IN FIGURES

1: gas diffusion electrode (anode electrode); 2: anion exchange membrane; 3: cation exchange membrane; 4: nickel foam supported. Pt/C electrode (cathode electrode); 5: hydrogen buffer tank; a: anode current collecting layer; b: anode gas chamber plate and frame; c: hydrogen diffusion electrode; d: anolyte chamber plate and frame; e: anion exchange membrane (AEM); f: intermediate chamber plate and frame; g: cation exchange membrane (CEM); h: cathode chamber plate and frame; i: cathode electrode; j: cathode current collecting layer; I: anode buffer tank; II: intermediate buffer tank; and III: cathode buffer tank.

DESCRIPTION OF THE PREFERRED EMBODIMENTS

The above-mentioned contents of the invention will be further described in detail in combination with preferred embodiments of examples. However, the following examples should not be construed as limitation to the scope of the invention. Any modification made within the spirit and principle of the invention, and equivalent replacement or improvement according to the common technical knowledge and common means of the art are included in the protection scope of the invention.

Example 1

Figure 1:
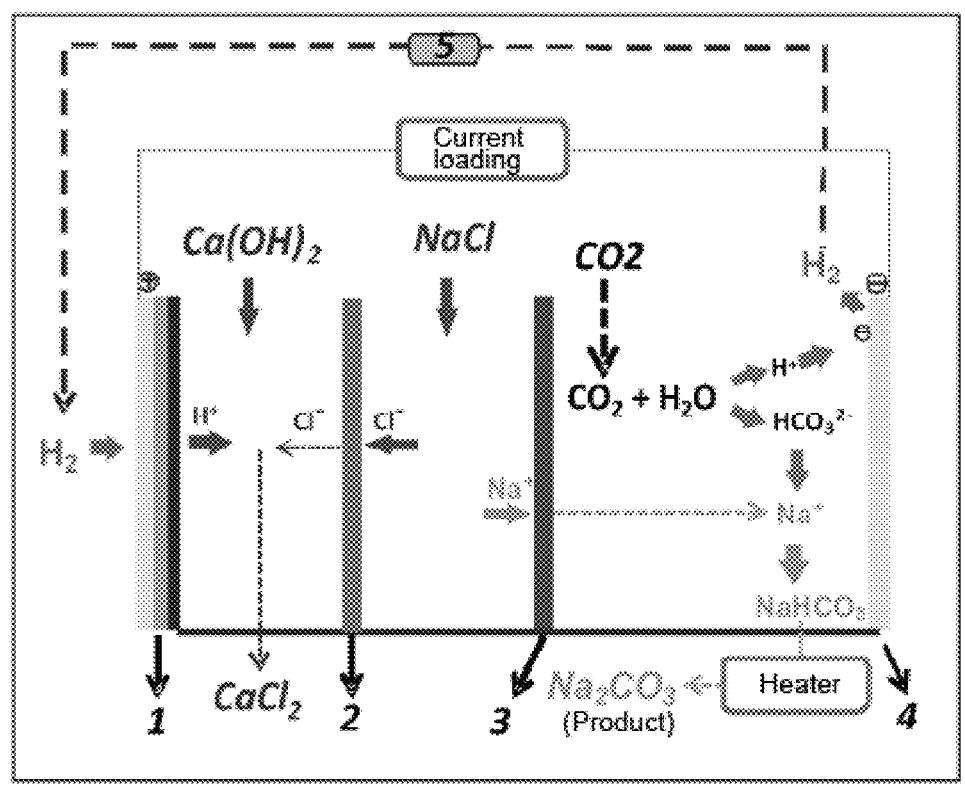
FIG. 1 is a schematic diagram of a method for using $CO_2$ mineralization to produce sodium carbonate and output electric energy.

The process of using $CO_2$ mineralization to produce sodium carbonate and output electric energy in this example is shown in FIG. 1. As the housing of a $CO_2$ generating device, a container was divided into an anode region, an intermediate region and a cathode region by a cation exchange membrane 3 which only allowed cation to permeate and prevented anion from permeating in the container and an anion exchange membrane 2 which only allowed anion to permeate and prevented cation from penetrating. A solid calcium hydroxide was added to 1 mol/L NaCl solution to form a cloudy solution containing saturated $Ca(OH)_2$, and the solution was added to the anode region as an anolyte. To the cathode, 0.3 mol/L $NaHCO_3$ solution was added as a catholyte, and 6 mol/L NaCl solution was added to the intermediate region as an intermediate electrolyte. A gas diffusion electrode 1 was used as the anode electrode, and an electrode 4 using nickel foam supported Pt/C catalyst was used as the cathode electrode. $CO_2$ gas was bubbled into the cathode region from the bottom of the container as the housing of the $CO_2$ generating device, and the hydrogen generated from the cathode electrode was collected and introduced into a buffer tank 5. The hydrogen from the buffer tank was introduced into the gas diffusion electrode for 1 h electrolytic reaction at 25° C., the current density was controlled to 7 $mA/cm^2$, and the tank voltage was maintained at 0.15V. After the reaction, the concentration of the $Ca^{2+}$ dissolved out after acid-base reaction in the anode region was determined with an atomic absorption spectrometer, and the concentration of the bicarbonate ion produced in the cathode region was tested by chemical titration. Compared with the theoretical formula, the current efficiency of sodium bicarbonate produced in the electrolytic process was 89%, and that of $Ca^{2+}$ produced in the anode region was 91%.

Example 2

The mineralization process of the example is shown in FIG. 1. As the housing of a $CO_2$ generating device, a container was divided into an anode region, an intermediate region and a cathode region by a cation exchange membrane 3 which only allowed cation to permeate and prevented anion from permeating in the container and an anion exchange membrane 2 which only allowed anion to permeate and prevented cation from penetrating. To the anode region, 1 mol/L aqueous ammonia was added as an anolyte, 1 mol/L $NaHCO_3$ solution was added to the cathode region as a catholyte, and saturated NaCl solution was added to the intermediate region as an intermediate electrolyte. A gas diffusion electrode 1 was used as the anode electrode, and an electrode 4 using nickel foam supported Pt/C catalyst was used as the cathode electrode. $CO_2$ gas was bubbled into the cathode region from the bottom of the container as the housing of the $CO_2$ generating device, and the hydrogen generated from the cathode electrode was collected and introduced into a buffer tank 5. The hydrogen from the buffer tank was introduced into the gas diffusion electrode for reaction. At 25° C., the resistance of the applied load was controlled to be 0, and the current density of tank reached 10 $mA/cm^2$. When the resistance of the applied load was controlled to +∞, the tank voltage reached 0.31V, and the measured maximum output power of the $CO_2$ generating device was 3.2 $W/m^2$.

Example 3

The mineralization process of the example is shown in FIG. 1. As the housing of a $CO_2$ generating device, a container was divided into an anode region, an intermediate region and a cathode region by a cation exchange membrane 3 which only allowed cation to permeate and prevented anion from permeating in the container and an anion exchange membrane 2 which only allowed anion to permeate and prevented cation from penetrating. To 1 mol/L NaCl solution, 1 mol/L $Na(OH)_2$ was added to form a mixed solution. The mixed solution was added to the anode region as an anolyte, saturated $NaHCO_3$ solution was added to the cathode region as a catholyte, and saturated NaCl solution was added to the intermediate region as an intermediate electrolyte. A gas diffusion electrode 1 was used as the anode electrode, and an electrode 4 using nickel foam supported Pt/C catalyst was used as the cathode electrode. $CO_2$ gas was bubbled into the cathode region from the bottom of the container as the housing of the $CO_2$ generating device, and the hydrogen generated from the cathode electrode was collected and introduced into a buffer tank 5. The hydrogen from the buffer tank was introduced into the gas diffusion electrode for reaction. At 25° C., the resistance of the applied load was controlled to be 0, and the current density was maintained at 12 $mA/cm^2$. Under the conditions above, electrolytic reaction was performed for 1 h, and the sodium bicarbonate produced after the 1 h electrolytic reaction was cooled, filtered, and dried at 110° C. to obtain 0.210 g sodium carbonate. A theoretical value of 0.237 g of sodium carbonate was produced by comparing with the faradaic current efficiency theory, the conversion rate of the produced sodium carbonate was up to 88.6%, and the measured maximum output power was 3.3 $W/m^2$. After the reaction, the solution in the anode region was subject to acid-base titration, and NaOH consumption was measured. At the same time, carbonate ions produced in the cathode region were subject to chemical titration. By comparing with the theoretical formula, the current efficiency of the produced sodium bicarbonate was up to 93%, and the current efficiency of acid-base reaction in the anode region reached 96%.

Example 4

Figure 2:
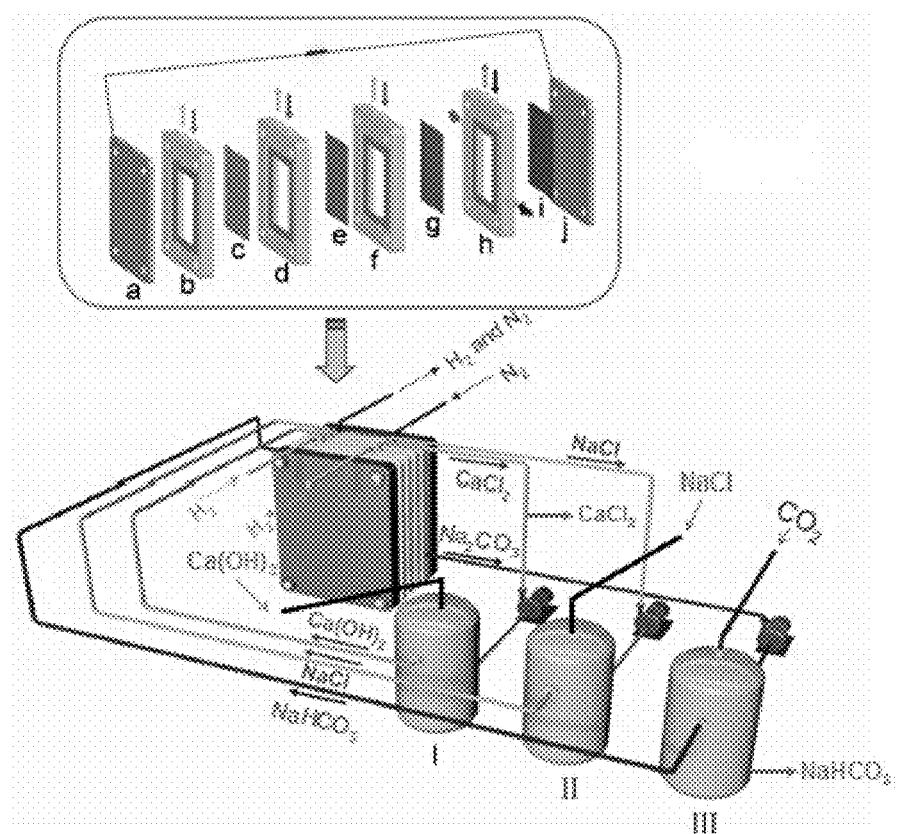
FIG. 2 is a schematic diagram of a $CO_2$ mineralized fuel cell as described in example 4 of the invention.

As shown in FIG. 2, a $CO_2$ mineralized fuel cell comprises an anode current collecting layer, an anode gas chamber plate and frame, a hydrogen diffusion electrode, an anolyte chamber plate and frame, an anion exchange membrane, an intermediate chamber plate and frame, a cation exchange membrane, a cathode chamber plate and frame, a cathode electrode and a cathode current collecting layer arranged successively. The anode current collecting layer and the cathode current collecting layer were connected by a circuit. The anode gas chamber plate and frame was provided with a raw hydrogen inlet and a raw hydrogen outlet. The cathode gas chamber plate and frame was provided with a carrier gas inlet (the inlet can be also enclosed) and a product hydrogen outlet. The anolyte chamber plate and frame, the intermediate chamber plate and frame, and the cathode chamber plate and frame were respectively provided with an inlet and an outlet for the corresponding electrolyte. The electrolyte inlet on the cathode chamber plate and frame was connected to the cathode buffer tank, and the electrolyte outlet on the cathode chamber plate and frame was also connected to the cathode buffer tank to form a circulation loop, thus returning the reacted electrolyte back to cathode buffer tank for recycle. Meanwhile, a $CO_2$ gas inlet was arranged on the cathode buffer tank and a solid-liquid separator was arranged in the cathode buffer tank or the outlet thereof. The electrolyte inlet on the intermediate chamber plate and frame was connected to the intermediate buffer tank and supplies electrolyte to the intermediate region through the buffer tank. The electrolyte outlet on the intermediate chamber plate and frame was connected to the intermediate buffer tank, and returns the reacted electrolyte back to the intermediate buffer tank for recycle. A sodium salt feeding inlet was arranged on the intermediate buffer tank. The electrolyte inlet on the anolyte chamber plate and frame was connected to the anode buffer tank and supplies electrolyte to the anode region through the buffer tank. The electrolyte outlet on the anolyte chamber plate and frame may be connected to a concentration and separator. The electrolytes in the three liquid chambers (anolyte chamber, intermediate chamber and cathode chamber) flow or circulate under the drive of a peristaltic pump. The inner volume of three liquid chambers was 15 ml and the anion exchange membrane (AEM) was placed between the intermediate chamber and the anode chamber (area S=4 $cm^2$). The anion exchange membrane CEM (S=4 $cm^2$) was placed between the intermediate chamber and the cathode chamber. The anode electrode was gas diffusion electrode (S=3.24 $cm^2$) and the cathode was electrode with Pt/C (S=3.24 $cm^2$) as the catalyst. An $H_2$ cylinder was connected to the anode side of the device to provide a hydrogen source for the gas diffusion electrode, and the hydrogen enters from the inlet of the anode and goes out of the outlet thereof. A $N_2$ cylinder was connected to the cathode inlet of the device, and $N_2$ was introduced into the carrier gas inlet at a flow rate of 10 ml/min so as to purge the $H_2$ generated at the cathode out of the hydrogen outlet (the purge step aims at detecting the hydrogen production more accurately, and nitrogen purge and the corresponding device could be omitted in the actual application). A $CO_2$ cylinder was connected to the external buffer tank at the cathode side. Both the cathode and anode were of current collecting layers made of stainless steel mesh.

Preparation of Electrode

The following three layers were provided on the gas diffusion electrode actually: current collecting layer, carbon cloth and catalyst layer. A 1 $mg/cm^2$ Pt catalyst (Shanghai Hesen Electric Co., Ltd.) was loaded on the carbon cloth with a filling and leveling layer. Afterwards, the carbon cloth and the titanium mesh of the current collecting layer were stacked together to press for 10 min at pressure of 5 MP and temperature of 25° C., thus obtaining a gas diffusion electrode. A Pt/C catalyst with the same load (1 mg/cm$^2$) as the anode was loaded on a nickel foam with the same surface area, dried for 2 h at 60° C., and lastly pressed for 10 min at 3 MP to obtain a cathode electrode. Optionally, Pt/C catalysts were loaded on the anode electrode and cathode electrode by spraying suspension. The preparation method of the Pt/C catalyst suspension is as follows: first, placing 0.1 Pgt/C (40% Pt) catalyst in a beaker; then, adding 1 ml of distilled water, 4 ml of absolute ethanol and 4.5 g of perfluorosulfonic acid solution, wherein ethanol and perfluorosulfonic acid play a role in dispersion and adhesion respectively; and spraying the black suspension obtained by sonicating the mixture.

Optionally, the preparation of the cathode electrode is divided into the following steps: first, placing 0.1 Pgt/C (40% Pt) catalyst in a beaker; then, adding 1 ml of distilled water, 4 ml of absolute ethanol and 4.5 g of Nafion solution, wherein ethanol and Nafion play a role in dispersion and adhesion respectively; spraying the black suspension obtained by sonicating the mixture to the carbon paper at 80° C. and allowing the support amount of Pt/C on the carbon paper to be 1 mg/cm$^2$; drying at 60° C. for 2 h, and finally pressing at 3 MPa for 10 min.

Firstly, 50 ml of 1 mol/L NaCl solution was added to each buffer tank during use, and the membrane potential caused by the difference in ion concentration was counteracted by a peristaltic pump at a pump speed of 15 ml/min. Before the formal start of the reaction, a voltage of 3V was applied to two electrodes of the system for 5 min so as to completely dissipate the $O_2$ adhering to the electrode surface. After the operation, 100 mg of Ca $(OH)^2$ was added to the anode buffer tank to prepare solution (Part I in FIG. 2). The $H_2$ flow rate was controlled to 10 ml/min by a mass flow meter, and the gas was introduced into the gas inlet of the gas diffusion electrode (part b in FIG. 2). The rate of introducing $CO_2$ into the cathode buffer tank was controlled to 10-20 ml/min. The flow of liquid between the extrinsic cycle and the reaction chamber was controlled to 15 ml/min throughout the experiment so as to ensure stability of the whole system. An electronic load (ItechIT 8511) was connected between the cathode and the anode of the system. After the start of the reaction, the generation of current was capable of being detected immediately, and the output voltage and the output power density was capable of being controlled by adjusting the load.

After the start of the experiment, 100 mg of analytically pure calcium hydroxide was added to the anode side of the CMFC system, saturated NaCl solution was added to the intermediate chamber, and 1 mol/L NaCl solution was added to the cathode side. $CO_2$ (20 ml/min) with purity of 99.99% was then introduced into the catholyte, and a current was generated immediately at this time. The voltage produced by the system with the continuous injection of $CO_2$ and power density became stable. The representative reaction of anode in the system was $Ca(OH)_2+H_2+2Cl^-\rightarrow CaCl_2+2H_2O+2e^-$, and the cathode produced $NaHCO_3$ through the reaction $2CO_2+2H_2O+2e^-+2Na^+\rightarrow 2NaHCO_3+H_2$.

Samples were quantitatively taken every 30 minutes at a current density of 2.5 A/m$^2$ to determine the concentration change of $HCO_3^-$ at the cathode side. A linear increase in $HCO_3^-$ concentration indicated that sodium bicarbonate was continuously produced in the catholyte. The average current efficiency (percentage of electrons entering the $NaHCO_3$ product) of the produced $NaHCO_3$ was 91.4% by calculation. The amount of $CaCl_2$ produced at the anode side was determined by determining the concentration change of chloride ions at the anode side by ion chromatography. The linear increase of chloride ion content was as expected, and the calculated average current efficiency of $CaCl_2$ generated within 120 min was 93.4%.

In the electrogenesis process, the compositions of inlet gas and outlet gas in the anode gas chamber plate and frame of the CMFC system were determined by gas chromatography. In the experiment, it was detected that the anode consumed hydrogen and the cathode produces hydrogen. As the role of $H_2$ was accelerating the electron transfer rate in the whole process, net stoichiometric $H_2$ generation and consumption should not exist in the reaction formula 1. The ratio of generated and consumed $H_2$ was calculated by gas chromatography. We found that the ratio of $H_2$ consumed by the anode was very close to that of $H_2$ generated by the cathode, which also experimentally proved that the amounts of $H_2$ generated and consumed by the anode and cathode were equal.

In the experiment, the solubility of $NaHCO_3$ in the solution was determined by acid-base neutralization titration: 0.5 ml of sample was taken from the cathode every half hour and transferred into a conical flask; 3 drops of methyl red-bromocresol green indicators were added and a proper amount of distilled water was added; the solution became bright green; and then 1 mol/L HCl with concentration of 0.001 was titrated into the solution till that the solution becomes dark red. In order to avoid the effect of $Na_2CO_3$ in the experiment, phenolphthalein indicator was added to the control group. The amount of generated $NaHCO_3$ was calculated according to the concentration difference ($\Delta c$) of the $HCO_3^+$ in solution before and after reaction and the volume (V) of the electrolyte, m=$\Delta c \times V$. At the anode side, the concentration of $CaCl_2$ in the solution was calculated by measuring the concentration of $Cl^-$ in the solution (C1) and the concentration of $Na^+$ (C2): C=(C1−C2)/2. The content of $Na^+$ was determined by atomic absorption spectrometry, and the content of $Cl^-$ was determined by ion chromatography. According to the experimental results, the anode generated $CaCl_2$, cathode generated $NaHCO_3$. At the cathode side, $CO_2$ was introduced into the solution to form $H_2CO_3$, the produced $H_2CO_3$ was quickly decomposed into $H^+$ and $HCO_3^-$. The $H^+$ gains electrons to generate $H_2$, and the $HCO_3^-$ remains in the solution. At the anode side, $H_2$ lost two electrons to become $H^+$ and the $H^+$ dissolved $Ca(OH)_2$ to produce $H_2O$ and $Ca^{2+}$. Under the action of the internal electric field, the intermediate salt solution tank provided $Na^+$ and $Cl^-$ for two electrodes. AEM and CEM in the system avoided the mix of the produced $CaCl_2$ and $NaHCO_3$ by selectively making the $Na^+$ enter the anode and the anion enter the cathode. It was found from the XRD and TGA analysis on the sample that the purity of $NaHCO_3$ was 99.4%.

Example 5

Effect of $CO_2$ on System

Test was carried out using the same device and operating procedure as that in Example 4. The only difference was that when the electrogenesis process became stable, 10 ml/min $N_2$ instead of $CO_2$ was introduced into the cathode reaction buffer tank. Afterwards, the output voltage and output power density gradually decreased to 0 eventually, at which time, $CO_2$ instead of $N_2$ was reintroduced into the cathode buffer tank, and the system immediately generated voltage and current again. In the whole process, the output voltage and power were recorded every 60 s, and the change in pH of the cathode side was determined and recorded at the same time. The results showed that the produced $H_2CO_3$ reduced the pH of the cathode when $CO_2$ was introduced into the system, accompanied by the generation of electric energy. Once $CO_2$ was replaced with $N_2$, the $H^+$ in the solution would not be sufficient to capture the electrons produced by the anode. In such case, $H_2O$ would play the receptor of electron and produce $OH^+$ while producing $H_2$, which would increase pH and gradually stop the electrogenesis process.

Effect of $Ca(OH)_2$ on System

Test was carried out using the same device and operating procedure as that in Example 4. The only difference was that 1 ml of saturated $Ca(OH)_2$ solution was added to the anode at the initial stage of the reaction. As electrogenesis process progresses, the $Ca(OH)_2$ of the anode was gradually consumed, and the output voltage and power density gradually decreased to zero eventually. Afterwards, 1 ml of saturated $Ca(OH)_2$ solution was again added to the anode, and the system externally outputted electric energy again.

One milliliter of saturated $Ca(OH)_2$ solution was added to the anode, and then the pH of the anode immediately rose and electric energy was generated. As the reaction progressed, the $Ca(OH)_2$ in the solution was gradually consumed, the pH decreased, and the output energy reduced to zero. After 1 ml of new saturated $Ca(OH)_2$ solution was added, the pH of the solution increased and electric energy was output again.

Based on the experimental results, we can conclude that the roles of $CO_2$ and $CaCl_2$ in the system are building a pH difference between the cathode and anode. When $H_2$ is introduced into the anode, the pH difference will be converted into the potential difference of the oxidation pair ($H^+/H_2$) at the anode and cathode. During external conduction, the system will output current. In the process, $CO_2$ provides $H^+$ for the anode, and $Ca(OH)_2$ provides $OH^-$ for the cathode. According to the Nernst equation, the theoretical cell voltage can be calculated according to the equation (2):

$$Ece = 011.0591(pHanode - pH(cathode)) \quad \text{(formula 2)}$$

In order to further confirm this theory, we plotted a relation curve between the cell voltage and the pH difference between anode and cathode. The results show that increasing the pH difference between the anode and cathode will increase the open-circuit voltage, which is consistent with result of the equation (2).

Hydrolysis of the $NaHCO_3$ produced in the cathode tank in the electrogenesis process will affect the pH of the solution. To test such effect, different electrolytes (NaCl instead of $NaHCO_3$) were added to the cathode. The results showed that the electrogenesis effect of 1 mol/L NaCl was better than that of saturated $NaHCO_3$ solution in the CMC system. This is because that the pH difference generated by the former in the system was greater than that of the latter, so that the former had higher output voltage and energy. The maximum output energy was 5.5 W/m² and the maximum open-circuit voltage (OCV) was 0.452V in the experiment.

Example 6

With the device as described in Example 4, $Ca(OH)_2$ was added to the anode in the experiment, saturated NaCl solution was added to the anode, and saturated $NaHCO_3$ solution was added to the cathode. $CO_2$ was not introduced at the beginning of the reaction. At the energy density of 30.86 A/m², the residual $HCO_3^-$ in the solution would provide $H^+$ for the reaction and become $CO_3^{2-}$ because of no introduction of $CO_2$ into the cathode. However, as the reaction progresses, the output energy density will gradually decrease from 3.5 W5/m² to 2.9 W6/m². At this time, excessive $CO_2$ was introduced into the cathode buffer tank. In this process, $CO_3^{2-}$ will be converted to $HCO_3^-$. When the solubility of sodium bicarbonate in the solution reaches the maximum value, crystal will be separated out. After solid-liquid separation, the solid phase can be used to prepare sodium bicarbonate or sodium carbonate. The liquid phase returns back to the CMFC cell system. The output energy immediately rises to 3.55 W/m² again. With recycle above, electric energy and sodium bicarbonate or sodium carbonate were produced continuously.

Example 7 Mineralization and Electrogenesis Performance of Other Basic Raw Materials At the proof-of-concept phase, we used analytically pure $Ca(OH)_2$ in our test. In order to test whether this system can effectively utilize the industrial solid wastes containing $Ca(OH)_2$, carbide slag and cement kiln dust obtained from the chemical plant were added to the anode region as the alkali source. In the experiment, 50 ml of 1 mol/L NaCl solution was added to the anode and cathode respectively, and 50 ml of saturated NaCl solution was added to the intermediate chamber. In the electrogenesis operation, the current value was adjusted from 0 to 25 mA at a gradient of 1 mA and every current value was held for 120 min. Throughout the process, the temperature of the system was maintained at 25° C. The results show that the two kinds of slag can be used to produce electricity, and the reactivity of carbide slag is very close to that of the analytically pure $Ca(OH)_2$.

In the experiment using different amines as the alkali sources, relevant experiments were carried out according to the same procedure as that described above. The results show that three different kinds of amines (10% ammonia, MEA and TEA) can produce the power density of 3.71, 2.81 and 1.02 W/m² respectively under the same reaction conditions.

Example 8 Stability of CMFC System

The stability of the CMFC system was investigated. In specific experiment, 300 ml of 1 mol/L NaCl solution was added to the cathode and anode of the system respectively, and 300 ml of saturated NaCl solution was added to the intermediate chamber. After the start of the experiment, an appropriate amount of carbide slag was added to the anode, and $CO_2$ was introduced into the catholyte at a certain flow. The fixed current density was 30.86 A/m², and the system continuously operated for 17 h or more. During this period, output power was determined every 2 min. The results show that the system has a good stability.

Example 9 Effect of $CO_2$ Concentration on Electrogenesis Effect

The concentration of $CO_2$ in the flue gas emitted from thermal power plants is low generally (usually <20%). In order to study the possibility of treating industrial flue gas directly with the CMFC system, mixed $N_2/CO_2$ was used to investigate the effect of $CO_2$ concentration on the electrogenesis process. Fifty milliliter of 1 mol/L NaCl solution was added to the cathode anode and cathode region respectively, and 50 ml of saturated NaCl solution was added to the intermediate chamber. In experiments, mixed $CO_2$ gases with different concentrations (10%, 20%, 50% and 100%) were introduced into the catholyte at a speed of 100 ml/min. The concentration of $CO_2$ was controlled by adjusting the flow rates of $N_2$ and $CO_2$. The device and operation method used in associated electrogenesis process are described in Example 4. The experimental results show that electric energy can be produced even when the $CO_2$ content is as low as 10%. As different concentrations of $CO_2$ result in different pH values at the cathode side, the higher the $CO_2$ concentration, the higher the output power density.

The examples are only preferred examples of the invention, and they are illustrative for the invention instead of limitation thereto. Those skilled in the art should understand that many changes, modifications and even equivalent alternations can be made to the invention without departing from the spirit and scope as defined by the claims of the invention, but will fall into the protection scope of the invention.

The invention claimed is:

1. A method for coproducing chemicals and electric energy, comprising:
    providing a fuel cell having an anode region containing an anode electrode and anolyte,
    a cathode region containing a cathode electrode and a catholyte, and an intermediate region containing electrolyte;
    adding an alkaline material into the anolyte;
    adding a sodium salt into the electrolyte;
    feeding $CO_2$ into the catholyte whereby forming hydrogen at the cathode electrode and bicarbonate ions in the catholyte;
    contacting hydrogen with the anode electrode to produce proton in the anolyte; and
    producing an electric current between the cathode electrode and the anode electrode when the cathode electrode and the anode electrode are connected.

2. The method according to claim 1, wherein an anion exchange membrane is disposed between and separates the anode region and the intermediate region, a cation exchange membrane is disposed between and separates the intermediate region and the cathode region, wherein sodium ions migrate from the intermediate region into the cathode region through the cation exchange membrane.

3. The method according to claim 1, further comprising forming sodium bicarbonate in the cathode region; and separating solid sodium bicarbonate from the catholyte.

4. The method according to claim 1, wherein the sodium salt is sodium chloride, sodium sulfate, or sodium nitrate.

5. The method according to claim 1, wherein the anolyte and/or catholyte contain sodium ions.

6. The method according to claim 1, wherein the alkaline material added to the anode region comprises at least one compound selected from the group consisting of calcium hydroxide, sodium hydroxide, ammonia, and potassium hydroxide.

7. The method according to claim 1, wherein the anode electrode is a gas diffusion electrode.

8. The method according to claim 1, characterized in that the cathode electrode is made of a nickel foam supported Pt/C catalyst.

9. The method according to claim 1, wherein hydrogen generated at the cathode electrode is fed to the anode region.

10. The method according to claim 1, further comprising storing the anolyte in a first vessel; and circulating the anolyte between the first vessel and the anode region.

11. The method according to claim 1, further comprising storing the intermediate electrolyte in a second vessel; and circulating the intermediate electrolyte between the second vessel and the intermediate region.

12. The method according to claim 1, further comprising storing the catholyte in a third vessel; and circulating the catholyte between the third vessel and the cathode region.

* * * * *